United States Patent [19]
Lu

[11] Patent Number: 5,341,905
[45] Date of Patent: Aug. 30, 1994

[54] SHOCK ABSORBER WITH VARIABLE DAMPING FORCE

[75] Inventor: Fu-Chung Lu, Kaohsiung Hsien, Taiwan

[73] Assignee: Kai Fa Industry Co., Ltd., Kaohsiung Hsien, Taiwan

[21] Appl. No.: 91,619

[22] Filed: Jul. 14, 1993

[51] Int. Cl.⁵ .................................. F16F 9/44
[52] U.S. Cl. ................................ 188/320; 188/319
[58] Field of Search ............ 188/282, 287, 317, 319, 188/320, 322.15, 322.22

[56] References Cited

U.S. PATENT DOCUMENTS

| | | | |
|---|---|---|---|
| 3,378,110 | 4/1968 | Parrish | 188/317 |
| 4,191,281 | 3/1980 | Nishikawa et al. | 188/319 |
| 4,647,026 | 3/1987 | Siemann et al. | 188/322.17 |
| 5,085,300 | 2/1992 | Kato et al. | 188/317 |
| 5,129,488 | 7/1992 | Furuya et al. | 188/317 |

FOREIGN PATENT DOCUMENTS 0117171  10/1978  Japan ...................... 188/319

*Primary Examiner*—Robert J. Oberleitner
*Assistant Examiner*—Chris Schwartz
*Attorney, Agent, or Firm*—Willian Brinks Hofer Gilson & Lione

[57] ABSTRACT

A shock absorber includes an outer tube filled with hydraulic fluid and an inner tube that extends into the outer tube and that contains an appropriate amount of hydraulic fluid and high pressure air therein. A piston is secured to an open bottom end of the inner tube and is formed with a central through hole and a plurality of fluid passages which communicate the inner and outer tubes. The piston further has a bottom surface which is formed with concentric first and second annular grooves and an annular wall that separates the annular grooves and that is formed with a notch to communicate the annular grooves. The fluid passages extend into the first annular groove. The second annular groove has a depth that increases gradually from one side of the notch to an opposite side thereof. A control rod is disposed inside the inner tube and has a bottom end that extends through the central through hole of the piston. An annular valve piece is connected axially to the bottom end of the control rod, is normally spaced from the bottom surface of the piston, and is formed with a plurality of fluid holes and a fluid slot. The control rod is rotated to rotate therewith the valve piece in order to align respectively the fluid holes in the valve piece with the fluid passages and in order to locate the fluid slot at a desired depth of the second annular groove.

3 Claims, 5 Drawing Sheets

SHOCK ABSORBER WITH VARIABLE DAMPING FORCE

BACKGROUND OF THE INVENTION

1. Field of the Invention

The invention relates to a shock absorber, more particularly to a shock absorber which has a variable damping force.

2. Description of the Related Art

Shock absorbers are installed in automotive vehicles in order to permit a Soft ride over small bumps and to provide passenger comfort. However, since the damping force that is offered by conventional shock absorbers is constant and cannot be adjusted so as to suit the vehicle load or the road conditions, passenger discomfort and damage to the vehicle usually occurs when the vehicle moves along a poorly maintained road.

SUMMARY OF THE INVENTION

Therefore, the objective of the present invention is to provide a shock absorber which has a damping force that can be varied so as to suit the vehicle load and the road conditions.

Another objective of the present invention is to provide a shock absorber which prevents undesired relative movement among its components.

Accordingly, the shock absorber with variable damping force of the present invention comprises:

an outer tube with a closed bottom end and an open top end, the outer tube being filled with hydraulic fluid;

an inner tube with an open bottom end that extends into the outer tube via the open top end of the outer tube, the inner tube having an open top end provided with a cover and a knob mounted rotatably on the cover, the inner tube containing an appropriate amount of hydraulic fluid and high pressure air therein;

a piston secured to the inner tube in the open bottom end of the inner tube, the piston being formed with a central through hole and a plurality of angularly spaced, circumferentially aligned and axially extending fluid passages which serve to communicate the inner and outer tubes, the piston further having a bottom surface which is formed with a first annular groove, a second annular groove that is concentric with the first annular groove, and an annular wall that separates the first and second annular grooves and that is formed with a notch to communicate the first and second annular grooves, the fluid passages extending into the first annular groove, the second annular groove having a depth that increases gradually from one side of the notch to an opposite side of the notch;

a control rod disposed inside the inner tube, the control rod having a top end that is connected to the knob and a bottom end that extends through the central through hole of the piston; and an annular valve piece connected axially to the bottom end of the control rod, the valve piece being normally spaced from the bottom surface of the piston and being formed with a plurality of circumferentially aligned and angularly spaced fluid holes and a fluid slot which is aligned With the second annular groove.

The knob is rotated so as to rotate therewith the control rod and the valve piece in order to align respectively the fluid holes in the valve piece with the fluid passages and in order to locate the fluid slot at a desired depth of the second annular groove so as to control a fluid flow rate through the fluid passages when the outer tube moves upwardly relative to the inner tube during a cushioning action.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
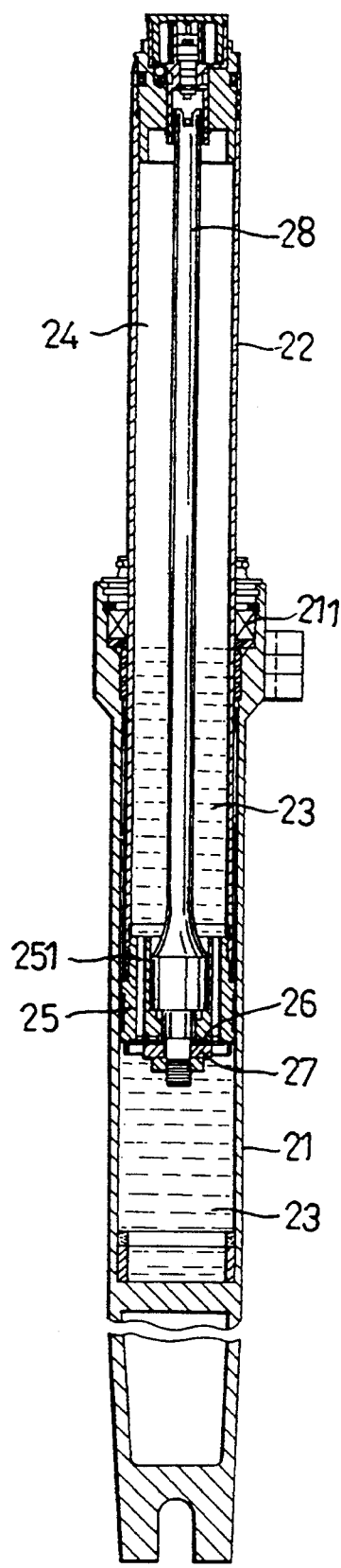
FIG. 1 is a longitudinal sectional view of the preferred embodiment of a shock absorber according to the present invention.

Referring to FIG. 1, the preferred embodiment of a shock absorber according to the present invention is shown to comprise an outer tube 21 and an inner tube 22 which extends into the outer tube 21 via an open top end of the latter. The outer tube 21 has a closed bottom end and an inner wall surface which is provided with a sealing member 211 adjacent to the open top end thereof. The sealing member 211 is in contact with the inner tube 22 and prevents hydraulic fluid from leaking out of the shock absorber via the open top end of the outer tube 21.

Figure 2:
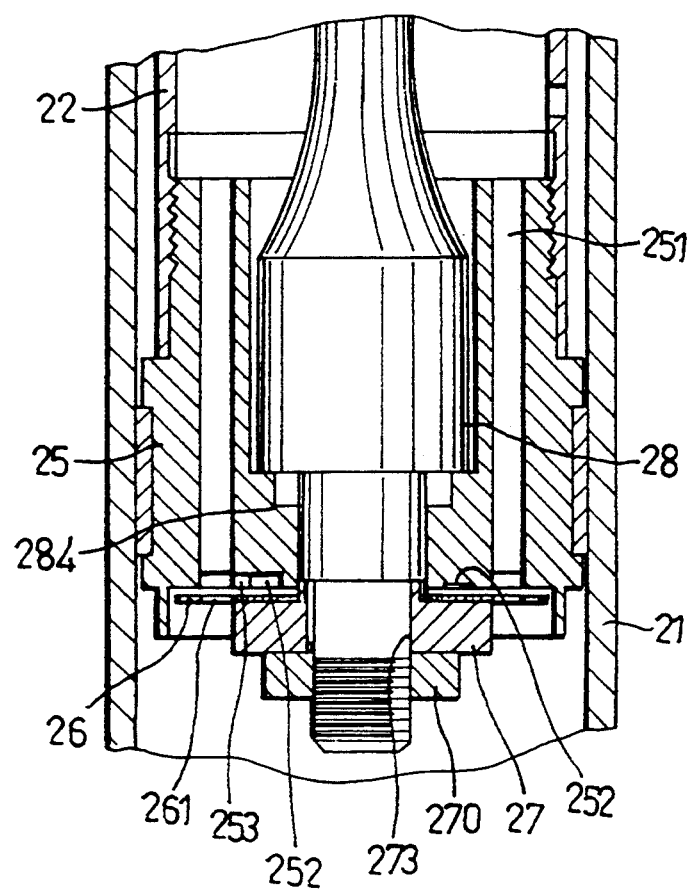
FIG. 2 is an enlarged view of a portion of FIG. 1 illustrating a piston of the preferred embodiment.
Figure 3:
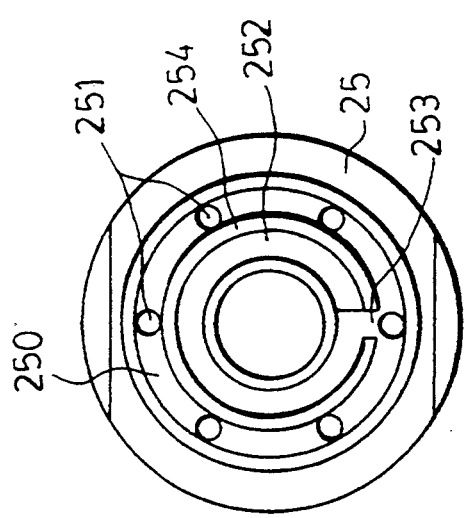
FIG. 3 is a bottom view of the piston shown in FIG. 2.

Referring to FIGS. 2 and 3, a piston 25 is secured to the inner tube 22 in an open bottom end of the latter. The piston 25 is formed with a plurality of angularly spaced, circumferentially aligned and axially extending fluid passages 251 which serve to communicate the inner and outer tubes 22, 21. The piston 25 further has a bottom surface which is formed with an outer annular groove 250. The fluid passages 251 extend into the outer annular groove 250. The bottom surface of the piston 25 is further formed with an inner annular groove 252 that is concentric with the outer annular groove 250. An annular wall 254 separates the inner and outer annular grooves 252, 250 and is formed with a notch 253 which communicates the inner and outer annular grooves 252, 250. The depth of the inner annular groove 252 increases gradually from one side of the notch 253 to an opposite side of the same.

Figure 4:
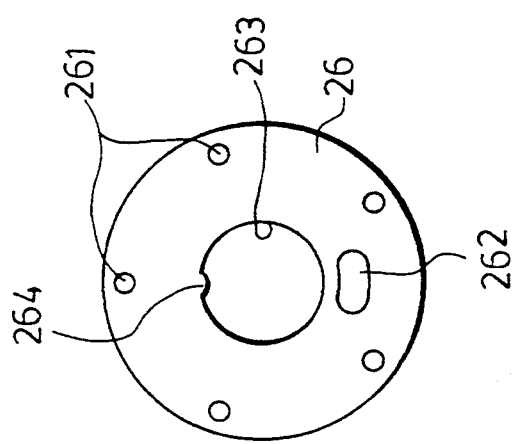
FIG. 4 is a top view of an annular valve piece of the preferred embodiment.

Referring to FIGS. 2 and 4, an annular valve piece 26 is provided adjacent to the bottom surface of the piston 25 to control the flow of hydraulic fluid from the outer tube 21 to the inner tube 22 when the former moves upwardly relative to the latter during a cushioning action. The valve piece 26 is connected to one end of a control rod 28 which extends axially into the inner tube 22, and is positioned adjacent to the bottom surface of the piston 25. The valve piece 26 is formed with a plurality of fluid holes 261 which are to be aligned with the fluid passages 251 in the piston 25. The valve piece 26 is further formed with a fluid slot 262 which is aligned with the inner annular groove 252. The control rod 28 is rotated to rotate therewith the valve piece 26 in order to align respectively the fluid holes 261 with the fluid passages 251 and to locate the fluid slot 262 at a desired depth of the inner annular groove 252 so as to control the fluid flow rate through the fluid passages 251.

Figure 5:
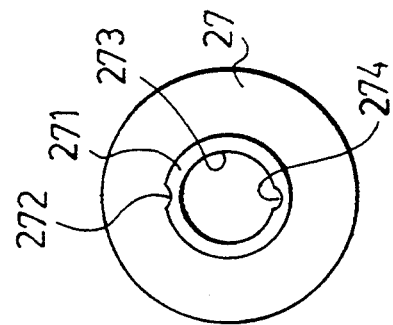
FIG. 5 is a top view of a valve seat of the preferred embodiment.
Figure 6:
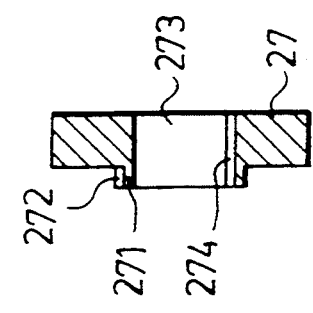
FIG. 6 is a sectional view of the valve seat shown in FIG. 5.

Referring to FIGS. 5 and 6, the valve seat 27 is formed with a central through hole 273 and has a top surface that is provided with an annular flange 271 around the through hole 273. The annular flange 271 has an outer wall surface which is formed with an axially extending groove 272. The valve seat 27 further has an inner wall surface which confines the through hole 273 and which is formed with an axially extending groove 274. The grooves 272, 274 are preferably disposed on a diametrically extending line.

Referring once more to FIGS. 2 and 4, the valve piece 26 is further formed with a central through hole 263 and a radial projection 264 which projects inwardly from the periphery defining the through hole 263. The valve piece 26 is sleeved on the annular flange 271 of the valve seat 27 such that the inward projection 264 extends into the groove 272 of the valve seat 27. Undesired rotation between the valve piece 26 and the valve seat 27 is thus prevented.

Figure 8:
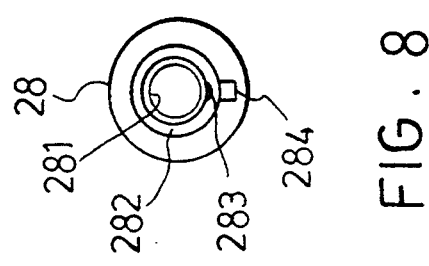
FIG. 8 is a bottom view of the control rod shown in FIG. 7.
Figure 7:
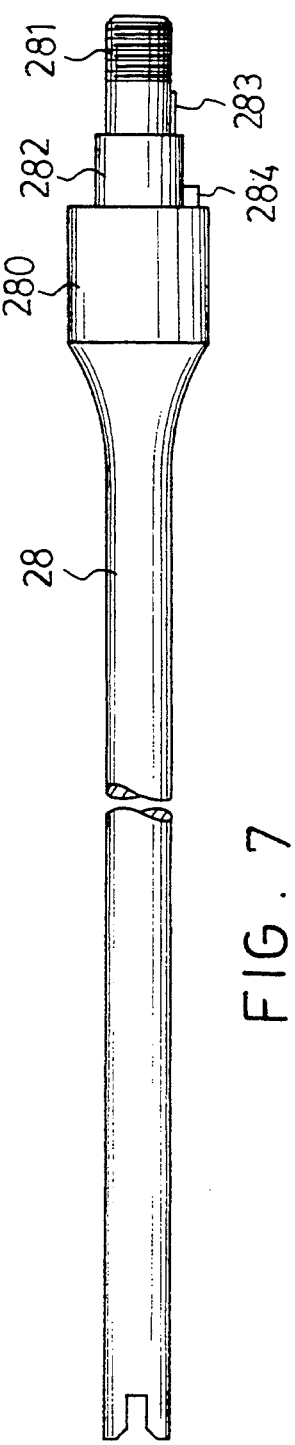
FIG. 7 is a side view of a control rod of the preferred embodiment.

Referring to FIGS. 7 and 8, the bottom end of the control rod 28 is formed with differently-sized first, second and third coaxial rod portions 280, 282, 281. The second rod portion 282 extends from the first rod portion 280 and has a diameter which is smaller than that of the first rod portion 280. The third rod portion 281 extends from the second rod portion 282 and has a diameter which is smaller than that of the second rod portion 282. The third rod portion 281 is formed with an axially extending locking strip 283 of predetermined length that projects in a radial outward direction starting from a distal end of the second rod portion 282. The second rod portion 282 is formed with a radial limit projection 284 that is adjacent to a distal end of the first rod portion 280.

Figure 9:
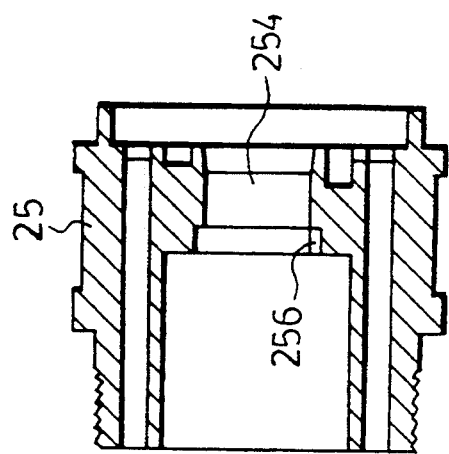
FIG. 9 is a sectional view of the piston of the preferred embodiment.
Figure 10:
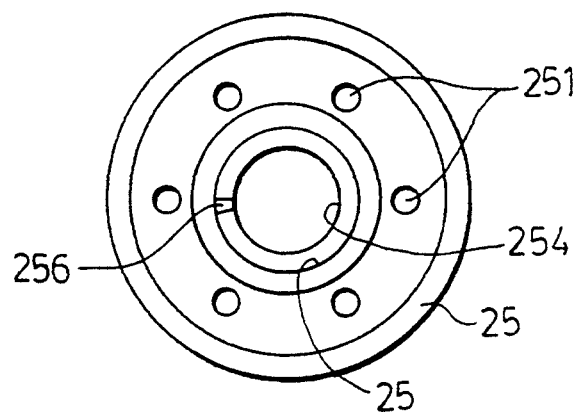
FIG. 10 is a top view of the piston of the preferred embodiment.

Referring to FIGS. 9 and 10, the piston 25 is formed with a central through hole 254 that is configured so as to conform with the shape of the bottom end of the control rod 28. The piston 25 further has an inner wall surface which is formed with a radial inward projection 256.

Referring once more to FIGS. 2, 6, 7 and 9, the third rod portion 281 of the control rod 28 is extended through the central through hole 254 of the piston 25, the central through hole 263 of the valve piece 26, and the central through hole 273 of the valve seat 27. The locking strip 283 of the control rod 28 extends into the groove 274 of the valve seat 27, thereby preventing any undesired relative movement between the valve seat 27 and the control rod 28. The control rod 28 is rotatable relative to the piston 25. The inward projection 256 of the piston 25 and the limit projection 284 of the control rod 28 serve to limit the angular rotation of the control rod 28 relative to the piston 25.

Figure 11:
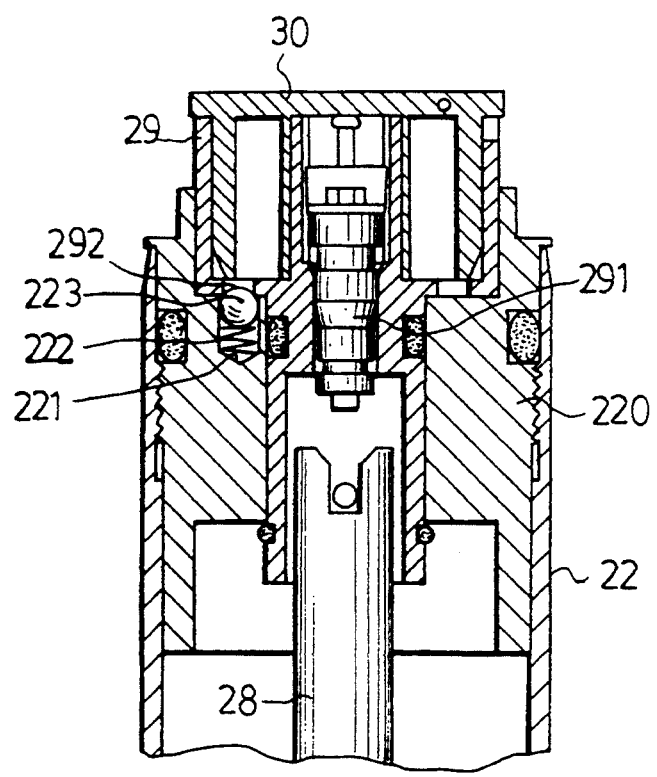
FIG. 11 is an enlarged view of a portion of FIG. 1 illustrating a knob-type rotary control of the preferred embodiment.

Referring to FIG. 11, a cover 220 is provided on an open top end of the inner tube 22. A knob 29 is mounted rotatably on a top surface of the cover 220. The knob 29 is provided with an air inlet unit 291 that is communicated with the interior of the inner tube 22. A cap 30 is provided on the knob 29 to cover the air inlet unit 291. The control rod 28 is connected to the knob 29 and rotates axially therewith. The knob 29 has a bottom surface which is formed with a plurality of angularly spaced and circumferentially aligned positioning grooves 292 that correspond with the fluid passages 251 in the piston 25. Only two positioning grooves 292 are shown in FIG. 11. The cover 220 has a top surface which is formed with a blind bore 221. A spring 222 and a steel ball 223 are received within the blind bore 221. The steel ball 223 is biased by the spring 222 so as to engage releasably a selected one of the positioning grooves 292 in order to align respectively the fluid holes 261 in the valve piece 26 with the fluid passages 251 and in order to locate the fluid slot 262 at a desired depth of the inner annular groove 252 when the knob 29 is rotated, thereby permitting multi-step adjustment of the damping force that is offered by the shock absorber of the present invention.

Assembly of the preferred embodiment is as follows: Referring once more to FIGS. 4, 5, 7 and 9, the valve piece 26 is initially sleeved on the annular flange 271 of the valve seat 27 so that the inward projection 264 extends into the groove 272 of the valve seat 27 to prevent undesired rotation therebetween. The third rod portion 281 of the control rod 28 is then extended through the central through hole 254 of the piston 25, the central through hole 263 of the valve piece 26, and the central through hole 273 of the valve seat 27. The locking strip 283 of the control rod 28 extends into the groove 274 of the valve seat 27 at this stage, thereby preventing undesired relative movement between the valve seat 27 and the control rod 28. Referring once more to FIG. 2, a nut 270 engages threadedly the third rod portion 281 of the control rod 28 in order to hold the valve seat 27 in place. Referring again to FIG. 1, after the preferred embodiment has been assembled, the outer tube 21 is then filled with hydraulic fluid 23, while the inner tube 22 is filled with an appropriate amount of hydraulic fluid 23 and high pressure air 24.

When the knob 29 is rotated, the control rod 28 rotates therewith, thereby aligning the fluid slot 262 with a desired depth of the inner annular groove 252 in the piston 25 in order to increase or decrease the fluid flow rate through the fluid passages 251 when the outer tube 21 moves upwardly relative to the inner tube 22 so as to cushion movement of a vehicle which incorporates the present invention.

Note that the damping force that is offered by the shock absorber of the present invention can be adjusted in order to correspond with the vehicle load and the road conditions. Note also that the components of the shock absorber can be easily assembled while ensuring that the components are properly positioned in order to avoid undesired relative movement among the same so as to prevent improper operation of the shock absorber.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A shock absorber with variable damping force, comprising:

an outer tube with a closed bottom end and an open top end, said outer tube being filled with hydraulic fluid;

an inner tube with an open bottom end that extends into said outer tube via said open top end of said outer tube, said inner tube having an open top end provided with a cover and a knob mounted rotatably on said cover, said inner tube containing hydraulic fluid and high pressure air therein;

a piston secured to said inner tube in said open bottom end of said inner tube, said piston being formed with a central through hole and a plurality of angularly spaced, circumferentially aligned and axially extending fluid passages which serve to communicate fluid between inner and outer tubes, said pins to further having a bottom surface which is formed with a first angular groove, a second annular groove that is concentric with said first annular groove, and an annular wall that separates said first and second annular grooves and that is formed with a notch to communicate said first and second annular grooves, said fluid passages extending into said first annular groove, said second annular groove having a depth that increases gradually from one side of said notch to an opposite side of said notch;

a control rod disposed inside said inner tube, said control rod having a top end that is connected to said knob and a bottom end that extends through said central through hole of said piston; and an annular valve piece connected axially to said bottom end of said control rod, said valve piece being adjacent to said bottom surface of said piston and being formed with a plurality of circumferentially aligned and angularly spaced fluid holes and a fluid slot which is aligned with said second annular groove;

said knob being rotated so as to rotate therewith said control rod and said valve piece in order to align respectively said fluid holes in said valve piece with said fluid passages and in order to locate said fluid slot at a desired depth of said second annular groove so as to control a fluid flow rate through said fluid passages when said outer tube moves upwardly relative to said inner tube during a cushioning action.

2. The shock absorber as claimed in claim 1, wherein:

said bottom end of said control rod is formed with differently-sized first, second and third coaxial rod portions, said second rod portion extending from said first rod portion and having a diameter which is smaller than that of said first rod portion, said third rod portion extending from said second rod portion and having a diameter which is smaller than that of said second rod portion, said third rod portion being formed with an axially extending locking strip of predetermined length that projects in a radial outward direction starting from a distal end of said second rod portion;

said central through hole of said piston having a shape that conforms with said bottom end of said control rod;

said shock absorber further comprising: a valve seat which is formed with a central through hole and which has a top surface that is provided with an annular flange around said central through hole, said annular flange having an outer wall surface that is formed with a first axially extending groove, said valve seat further having an inner wall surface which confines said central through hole and which is formed with a second axially extending groove, said bottom end of said control rod extending through said central through hole of said valve seat such that said locking strip of said control rod extends into said second axially extending groove; and a nut which engages threadedly said bottom end of said control rod so as to retain said valve seat thereon; and said valve piece being formed with a central through hole and a radial projection which projects inwardly from a periphery defining said central through hole, said valve piece being sleeved on said annular flange of said valve seat such that said inward projection extends into said first axially extending groove of said valve seat.

3. The shock absorber as claimed in claim 1, wherein said knob has a bottom surface which is formed with a plurality of angularly spaced and circumferentially aligned positioning grooves that correspond with said fluid passages of said piston, and said cover has a top surface which is formed with a blind bore that receives a spring-loaded ball therein, said knob being rotated so as to enable said ball to engage releasably a selected one of said positioning grooves in order to align respectively said fluid holes in said valve piece with said fluid passages and in order to locate said fluid slot at a desired depth of said second annular groove.

* * * * *

UNITED STATES PATENT AND TRADEMARK OFFICE
CERTIFICATE OF CORRECTION

PATENT NO. : 5,341,905
DATED : August 30, 1994
INVENTOR(S) : Fu-Chung Lu

It is certified that error appears in the above-indentified patent and that said Letters Patent is hereby corrected as shown below:

Col. 5, In claim 1, line 17, after "between" insert --said--.

Col. 5, In claim 1, lines 17-18, delete "pins to" and substitute --piston--.

Col. 5, In claim 1, line 19, delete "angular" and substitute --annular--.

Signed and Sealed this

Twenty-fourth Day of October, 1995

Attest:

BRUCE LEHMAN

*Attesting Officer*  *Commissioner of Patents and Trademarks*